United States Patent Office 3,646,086
Patented Feb. 29, 1972

3,646,086
PREPARATION OF AMINE COMPLEXES OF
ALUMINUM HYDRIDE
Leslie L. Sims, Mobile, Ala., assignor to Ethyl
Corporation, New York, N.Y.
No Drawing. Continuation of application Ser. No.
729,913, May 17, 1968. This application Oct. 5,
1970, Ser. No. 78,155
Int. Cl. C07f 5/06
U.S. Cl. 260—448 R                                    6 Claims

ABSTRACT OF THE DISCLOSURE

A process for the synthesis of amine complexes of aluminum hydride by the reaction of a tertiary amine hydrohalide or a tertiary amine and an aluminum halide with sodium aluminum hydride in the presence of an ether solvent.

CROSS-REFERENCES TO RELATED APPLICATIONS

This application is a continuation of application Ser. No. 729,913, filed May 17, 1968, now abandoned.

BACKGROUND OF THE INVENTION

Amine complexes of aluminum hydride are known, their composition, properties and preparation being disclosed in the literature. Wiberg, Graf, and Uson, in their publication entitled "About Monomeric Aluminum Hydride, $AlH_3$," Z. Anorg. Allgem. Chem. 272: 221 and 226 (1953) disclose a method of preparation whereby aluminum chloride is reacted with lithium aluminum hydride to produce aluminum hydride which in turn is reacted with trimethylamine in the presence of ether solvent to produce trimethylamine complex of aluminum hydride.

The above process lacks the advantage of utilizing sodium aluminum hydride. Sodium aluminum hydride is less expensive and more easily handled in a chemical process than lithium aluminum hydride. Furthermore, aluminum hydride solutions in diethyl ether prepared from sodium aluminum hydride tend to be considerably more stable than solutions prepared from lithium aluminum hydride. Sodium aluminum hydride derived solutions can be stored for much longer periods of time before precipitation of polymeric, partially etherated aluminum hydride occurs.

SUMMARY OF THE INVENTION

The present invention provides a method for forming an amine complex of aluminum hydride comprising, in combination, the steps of reacting a tertiary amine hydrohalide or a tertiary amine and an aluminum halide with sodium aluminum hydride in the presence of an ether solvent, and recovering the complex formed in the reaction mixture.

DESCRIPTION OF THE PREFERRED EMBODIMENTS

The present invention provides a novel but simple method for preparing amine complexes of aluminum hydride by reacting a tertiary amine hydrohalide or a tertiary amine and an aluminum halide with sodium aluminum hydride in the presence of an ether solvent.

Aluminum trihalides suitable for use in the instant process are, for example, aluminum trichloride, aluminum tribromide, and aluminum triiodide, all in their anhydrous forms. Aluminum trichloride is especially preferred since it is a staple article of commerce and hence offers a cost advantage.

It has been found that the amine reactant of the present invention must be of a tertiary configuration. Thus, suitable amines (it is to be understood that the following amines may be amine hydrohalides) which may be utilized in the invention are tertiary aryl, alkyl, alkenyl and aralkyl amines, including monoamines, diamines, triamines, etc. Typically, the amines of the present invention may be triphenyl amine; tetramethylethylenediamine, diphenylmethylamine; triethylenediamine, phenylmethylethylamine; tricyclohexylamine; hexamethylene tetraamine; phenylcyclohexyloctylamine; or mixtures thereof, and other similar compounds. A more preferred class of amines for use in the invention are aliphatic tertiary amines, which include trialkylamine and trialkenylamine. Further, these amines may generally contain up to about 40 carbon atoms each, and preferably contain alkyl and alkenyl groups each having from 1 to about 10 carbon atoms. Thus, useful amines of this class are tri-n-butylamine; tri-sec-butylamine; dibutylpentylamine; tri-tert-butylamine; n-butyl-octyl-sec-butylamine; tripentylamine; trihexylamine; trihexenylamine; trioctadecylamine; didecenylamine; tridecenylamine; and the like, as well as mixtures thereof. A most preferred class of amines for use in the invention are those in the lower alkyl amines such as triethylamine, triisopropylamine, and particularly, trimethylamine. By the term "lower" is meant that the alkyl groups each contain 6 carbon atoms or less. The above compounds may be readily prepared by procedures well known to those skilled in the art. The products of the present invention are these amines complexed with aluminum hydride.

The ether diluent employed pursuant to the practice of this invention is one that is liquid under the process conditions as well as being inert to the reactants and the end product tertiary amine complex of aluminum hydride. Suitable ether diluents are dimethyl ether, diethyl ether, dibutyl ether, tetrahydrofuran, tetrahydropyran and dioxane. The ether diluent is preferably one wherein the end product tertiary amine complex of aluminum hydride is readily soluble therein and wherein the by-product is not since this provides an efficacious manner by which they can be separated. For this reason, the lower molecular weight alkyl and cyclic ethers are preferred since the solubility of the end product amine complex of aluminum hydride is generally very good in these diluents. When operating under preferred operating conditions as hereinafter defined, the diluent is preferably one having a boiling point of at least about −25 to 100° C., with diethyl ether and tetrahydrofuran being the most preferred solvents.

In order that those skilled in the art can thus appreciate the process of this invention, the following examples are given by way of description and not by way of limitation.

In all runs the reactants are protected from the atmosphere by a nitrogen blanket. Transfer, weighing, etc. of materials is carried out in a nitrogen dry box.

Example I.—Trimethylamine aluminum hydride

A one liter three-neck creased flask was fitted with an air cooled condenser and high speed stirrer. Sodium aluminum hydride (16.2 grams, 0.3 mole) and 300 milliliters of diethyl ether were placed in a flask and vigorously stirred while 28.7 grams (0.3 mole) of trimethylamine hydrochloride was added batchwise over a one hour period. The mixture was stirred an additional two hours and filtered. The ether was removed at reduced pressure. Weight of product was 26 grams. The product was approximately 50 percent trimethylamine aluminum hydride. Yield was 45 percent.

Example II.—Trimethylamine aluminum hydride

Into a two liter three-neck creased flask is charged 32.4 grams (0.6 mole) of sodium aluminum hydride. The flask is cooled in a carbon dioxide ("Dry Ice")-acetone bath to −38° C. and dimethyl ether is led in from a cylinder and condensed in the flask. About 400 grams of dimethyl ether is charged.

To this cold mixture is added slowly 21.6 grams (0.17 mole) of aluminum chloride. Thirty-nine grams of trimethylamine is then charged to the vigorously stirred cold reaction mixture. After the trimethylamine is charged the mixture is allowed to warm to room temperature with stirring and then heated to 40° C. to drive off excess dimethylether and amine.

Example III.—Trimethylamine aluminum hydride

Example II is repeated except diethylether is used in place of dimethyl ether and similar results are achieved.

Example IV.—Triethylamine aluminum hydride

Example II is repeated except triethylamine is substituted for trimethylamine and similar results are achieved.

Example V.—Bis(trimethylamine) aluminum hydride

Sodium aluminum hydride (64.8 grams/1.2 moles) is charged in a stirred two-liter three-neck creased flask along with 500 milliliters of diethyl ether. The flask contents are stirred and cooled to −10° C. using a carbon dioxide ("Dry Ice")-acetone bath as coolant. To this mixture is added in small batches 90.7 grams (0.34 mole) of aluminum bromide, keeping the temperature between −10 and 0° C. Trimethylamine (190 grams/3.2 moles) is led into the reaction mixture keeping this flow slow enough to prevent a temperature rise above the desired −10 to 0° C. After trimethylamine addition is completed the mixture is allowed to warm to room temperature with stirring. The product mixture is filtered to remove sodium bromide and excess aluminum bromide, and the ether evaporated from the filtrate leaving bis-trimethylamine aluminum hydride.

Example VI.—Bis(triisopropylamine) aluminum hydride

Example V is repeated except triisopropylamine is substituted for trimethylamine and similar results are achieved.

Example VII.—Trimethylamine aluminum hydride

In a two-liter three-neck creased flask is charged 32.4 grams (0.6 mole) of sodium aluminum hydride and 400 milliliters of tetrahydrofuran. The flask is cooled to −10° C. with a carbon dioxide ("Dry Ice")-acetone bath and 21.6 grams (0.17 mole) of aluminum chloride is added in small batches keeping the temperature between −10 and 0° C. Forty-two grams (0.71 mole) of trimethylamine is then charged into the stirred mixture, keeping the addition rate slow enough to prevent a temperature rise above 0° C. After the trimethylamine addition is completed, the stirred reactants are allowed to warm to room temperature and then filtered to remove sodium chloride and unreacted sodium aluminum hydride. The ether is removed under vacuum at room temperature leaving solid trimethylamine aluminum hydride.

Example VIII.—Tri-n-butylamine aluminum hydride

Example VII is repeated except tri-n-butylamine is substituted for trimethylamine and similar results are achieved.

Several factors influence the reactions of the above examples, the most important of which being the rate of addition of amine. A slow addition rate increases the yield of product and maintains the reaction temperature in the desired range (0 to 70° C.). With the monoamines, reduced pressure distillation of solvent in the final isolation steps tends to cause loss of product if distillation is carried too far. The best yields of amine complex are obtained when distillation is stopped when the product still contains about 15 percent solvent. Further purification can be effected by sublimation; however, if the product is intended for aluminum plating where solvent does not interfere, further purification may be unnecessary.

The maximum temperature at which the present process is conducted is mainly governed by the decomposition temperature of the end product tertiary amine complex of aluminum hydride. Generally, temperatures anywhere from about −40° C. to 100° C. are suitable. When utilizing the preferred reactants discussed above, it is preferred to operate at temperatures of from about 0° C. to about 70° C.

The present process being exothermic, the most attractive manner in which to conduct this process with a tertiary amine hydrohalide reactant is to charge the reactants into the ether diluent which is initially at room temperature (25–30° C.). The heat evolved will raise the temperature of the reaction system and the reaction can be allowed to proceed on its own accord inasmuch as sufficient diluent may be used as a heat sink to keep the temperature within the ranges described above. However, cooling means may be employed if desired. Upon substantial completion of the reaction as evidenced by cessation of heat evolution, heat can be applied to the reaction mass to ensure full utilization of the raw materials. However, the reaction mass should not be heated to the decomposition of the desired product.

When the aluminum halide-tertiary amine reactant combination is employed, the preferred manner in which to conduct the process is to add the aluminum halide to the sodium aluminum hydride in the solvent and then add the tertiary amine to the resultant slurry. The rate of reaction and temperature are controlled by the rate of addition of amine. Little or no reaction occurs until the amine is added. Upon completion of addition of the amine, heat can be applied to the reaction mass to ensure full utilization of the raw materials. Of course, the reaction mass should not be heated to the decomposition temperature of the desired product.

The pressure at which the instant process is conducted is not a limiting factor; generally, the pressures anywhere from about atmospheric and above are suitable. An economical feature of this process is that it can be conducted at low pressures, for example on the magnitude of from about atmospheric to 50 p.s.i.g., since such pressures are easiest to achieve and are most economical. The operating pressure to be employed is largely dictated by the boiling point of the particular ether diluent utilized which must be maintained essentially in its liquid state during the reaction in order to serve its intended purpose.

At any pressure the process is conducted under an inert atmosphere to avoid oxidation of the reactants and the end product tertiary amine complex of aluminum hydride. Suitable inert gaseous media for this purpose are nitrogen, hydrogen, gaseous aliphatic hydrocarbons, neon, argon, krypton, and the like. In some instances (e.g. where the volatilities of each of the members of the reaction are sufficiently low) the process may be conducted under vacuum conditions.

The present process is conducted under anhydrous conditions to avoid excessive hydrolysis of the sodium aluminum hydride reactant. However, slight traces of moisture can be tolerated such as that normally present in commercially pure materials. For this reason, it is preferred to employ a slight excess of the sodium aluminum hydride reactant since it will eliminate any small amount of moisture being introduced into the system and also ensure complete reaction of the other reactants. About 3.1 to about 5 moles of sodium aluminum hydride per mole of the aluminum trihalide may be employed with good results.

The composition of the end product is mainly a function of the amount of amine present during the course of the reaction. Thus, where it is preferred to produce predominantly a mono-tertiary amine complex of aluminum hydride, the molar ratio of the tertiary amine to that of aluminum trihalide is preferably maintained at about 1:1. By the same token, where the bis-tertiary amine complex of aluminum hydride is desired the molar ratio of the tertiary amine to the trihalide is preferably about 2:1 or higher.

As can be seen from the above working examples, the reaction proceeds very rapidly. The process of this invention can be conducted on a continuous, semi-continuous, or batch basis. Generally, residence times of from about a few minutes to about 1 hour are suitable for the realization of high yields.

Compounds produced by the present invention are excellent aluminum plating agents and exceptionally pure aluminum coatings are easily realized, for example see U.S. Patent 3,375,129. Also, the compounds prepared by way of the novel process of this invention are useful as reducing agents for the preparation of other metal hydrides, as well as mixed metal hydrides.

It is to be understood that the present invention is not limited by the specific embodiments described hereinabove, but includes such changes and modifications as may be apparent to one skilled in the art upon reading the appended claims.

What is claimed is:

1. A method of forming an amine complex of aluminum hydride, comprising in sequence, the steps of:

(a) adding sodium aluminum hydride to an ether solvent;
    (b) adding an aluminum halide to the mixture of sodium aluminum hydride and ether solvent, thereby forming a slurry;
    (c) adding a tertiary amine to the slurry; and
    (d) recovering the complex formed in the reaction mixture.

2. The method of claim 1, wherein the aluminum halide is aluminum chloride.

3. The method of claim 2, wherein the tertiary amine is selected from the group consisting of trimethylamine, triethylamine and triisopropylamine.

4. The method of claim 2, wherein the ether solvent has a boiling point of at least about −25° C. to 100° C.

5. The method of claim 2, wherein the ether solvent is diethylether.

6. The method of claim 2, wherein the ether solvent is tetrahydrofuran.

References Cited

Wiberg et al.: Z. Anorg. un Allge. Chemie, vol. 272, pp. 221–226 (1953).

Ruff et al.: J. Amer. Chem. Soc., vol. 82, pp. 2141–2144 (1960).

JAMES E. POER, Primary Examiner

H. M. S. SNEED, Assistant Examiner